United States Patent
Frodigh et al.

(10) Patent No.: US 10,959,362 B2
(45) Date of Patent: Mar. 30, 2021

(54) TURF MAINTENANCE SYSTEM

(71) Applicant: SmarTerra LLC, Westwood, MA (US)

(72) Inventors: Peter T. Frodigh, Westwood, MA (US); Matthew D. Powell, Westwood, MA (US)

(73) Assignee: SmarTerra, LLC, Westwood, MA (US)

( * ) Notice: Subject to any disclaimer, the term of this patent is extended or adjusted under 35 U.S.C. 154(b) by 0 days.

(21) Appl. No.: 16/908,407

(22) Filed: Jun. 22, 2020

(65) Prior Publication Data
US 2020/0396886 A1 Dec. 24, 2020

Related U.S. Application Data

(60) Provisional application No. 62/946,128, filed on Dec. 10, 2019, provisional application No. 62/915,384, filed on Oct. 15, 2019, provisional application No. 62/915,369, filed on Oct. 15, 2019, provisional application No. 62/915,327, filed on Oct. 15, 2019,
(Continued)

(51) Int. Cl.
| | |
|---|---|
| *A01B 45/02* | (2006.01) |
| *G08C 17/02* | (2006.01) |
| *G01D 21/02* | (2006.01) |
| *A01G 25/00* | (2006.01) |
| *A01B 76/00* | (2006.01) |
| *G01V 15/00* | (2006.01) |
| *A01B 71/02* | (2006.01) |

(52) U.S. Cl.
CPC ............ *A01B 45/02* (2013.01); *A01B 45/023* (2013.01); *A01B 71/02* (2013.01); *A01B 76/00* (2013.01); *A01G 25/00* (2013.01); *G01D 21/02* (2013.01); *G01V 15/00* (2013.01); *G08C 17/02* (2013.01)

(58) Field of Classification Search
CPC .......... A01B 45/02; A01G 25/00; B05B 15/16
See application file for complete search history.

(56) References Cited

U.S. PATENT DOCUMENTS

| | | | |
|---|---|---|---|
| 5,521,514 A | 5/1996 | Nelson et al. | |
| 7,058,479 B2 * | 6/2006 | Miller | A01G 25/16 239/69 |
| 8,862,277 B1 | 10/2014 | Campbell et al. | |

(Continued)

FOREIGN PATENT DOCUMENTS

| | | |
|---|---|---|
| EP | 3395137 A1 | 10/2018 |
| JP | 2019103431 A | 6/2019 |
| JP | 2019149966 A | 9/2019 |

OTHER PUBLICATIONS

International Search Report and Written Opinion dated Sep. 11, 2020 in related International Application Serial No. PCT/US2020/039002, 22 pages.

(Continued)

*Primary Examiner* — Benjamin F Fiorello
(74) *Attorney, Agent, or Firm* — Brian J. Colandreo; Jeffrey T. Placker; Holland & Knight LLP

(57) ABSTRACT

A below-grade smart irrigation object includes: an input signal portion configured to receive an energizing signal for the below-grade smart irrigation object; an output signal portion configured to indicate the location of the below-grade smart irrigation object in response to receiving the energizing signal; and an irrigation portion configured to effectuate an irrigation operation.

12 Claims, 5 Drawing Sheets

Related U.S. Application Data provisional application No. 62/864,799, filed on Jun. 21, 2019.

(56) References Cited

U.S. PATENT DOCUMENTS

| | | | |
|---|---|---|---|
| 2009/0150003 A1* | 6/2009 | Jordan | A01K 15/021 |
| | | | 700/284 |
| 2010/0154898 A1 | 6/2010 | Gauthier, III | |
| 2012/0084115 A1* | 4/2012 | Cline | A01G 25/167 |
| | | | 705/7.27 |
| 2012/0237083 A1 | 9/2012 | Lange et al. | |
| 2013/0180742 A1 | 7/2013 | Wendte et al. | |
| 2013/0202366 A1* | 8/2013 | Maas | A01B 45/026 |
| | | | 405/271 |
| 2013/0333342 A1 | 12/2013 | Keski-Luopa et al. | |
| 2014/0311762 A1 | 10/2014 | Behmlander et al. | |
| 2015/0137957 A1 | 5/2015 | Glispy | |
| 2015/0216101 A1 | 8/2015 | Zabel et al. | |
| 2015/0309496 A1 | 10/2015 | Kah et al. | |
| 2016/0195876 A1 | 7/2016 | Mattsson et al. | |
| 2017/0196160 A1 | 7/2017 | Bjerketvedt et al. | |
| 2018/0103571 A1 | 4/2018 | Kinkead et al. | |
| 2018/0160613 A1 | 6/2018 | Kovach et al. | |
| 2018/0255705 A1 | 9/2018 | Keski-Luopa et al. | |
| 2019/0101641 A1 | 4/2019 | Hogan et al. | |
| 2019/0126310 A1* | 5/2019 | Mather | B05B 15/16 |
| 2019/0141919 A1* | 5/2019 | Kundra | G06K 9/00765 |
| | | | 348/159 |
| 2019/0389519 A1* | 12/2019 | Bergsten | B62D 49/0621 |
| 2020/0226851 A1 | 7/2020 | Harmon et al. | |

OTHER PUBLICATIONS

International Search Report and Written Opinion dated Oct. 14, 2020 in related International Application Serial No. PCT/US2020/039007, 10 pages.

International Search Report and Written Opinion dated Sep. 14, 2020 in related International Application Serial No. PCT/US2020/039012, 18 pages.

International Search Report and Written Opinion dated Sep. 29, 2020 in related International Application Serial No. PCT/US2020/038992, 136 pages.

* cited by examiner

TURF MAINTENANCE SYSTEM

RELATED APPLICATION(S)

This application claims the benefit of the following: U.S. Provisional Application Nos. 62/864,799, filed on 21 Jun. 2019; 62/915,327, filed on 15 Oct. 2019; 62/915,369, file on 15 Oct. 2019; 62/915,384, filed on 15 Oct. 2019; and 62/946,128, filed on 10 Dec. 2019, their entire contents of which are each incorporated herein by reference.

TECHNICAL FIELD

This disclosure relates to turf maintenance systems and, more particularly, to turf aeration systems.

BACKGROUND

Prior to the turf aeration process, a significant amount of time and energy must be expended in an effort to prepare the grounds for aeration. The reason for such prep work is to ensure that expensive, subterranean irrigation equipment is not damaged as the aeration equipment passes in close proximity to the subterranean irrigation equipment.

Currently, the operator of the aeration equipment must manually raise and lower the aeration equipment to avoid damaging such subterranean irrigation equipment (which is a daunting task when you consider that the average golf course has over 500 buried sprinkler heads). And further complicating the situation is that the location of this subterranean irrigation equipment is not always accurately known, often resulting in damage to the subterranean irrigation equipment.

SUMMARY OF DISCLOSURE

Concept 4/5

In one implementation, a below-grade smart irrigation object includes: an input signal portion configured to receive an energizing signal for the below-grade smart irrigation object; an output signal portion configured to indicate the location of the below-grade smart irrigation object in response to receiving the energizing signal; and an irrigation portion configured to effectuate an irrigation operation.

One or more of the following features may be included. The input signal portion may be configured to receive a wireless energizing signal from a wirelessly-coupled turf maintenance machine. The wirelessly-coupled turf maintenance machine may include a turf aeration system. The input signal portion may be configured to receive a wired energizing signal from a remote electronic device. The remote electronic device may include one or more of: a personal computer; a wireless electronic device; a control panel; and a master control system. The output signal portion may be configured to provide a wireless output signal that indicates the location of the below-grade smart irrigation object to a wirelessly-coupled turf maintenance machine. The wirelessly-coupled turf maintenance machine may include a turf aeration system. The wirelessly-coupled turf maintenance machine may be configured to raise at least a portion of the turf aeration system in response to receiving the wireless output signal. The wirelessly-coupled turf maintenance machine may be configured to disable at least a portion of the turf aeration system in response to receiving the wireless output signal. The wirelessly-coupled turf maintenance machine may be configured to provide a visual and/or audible notification to an operator of the turf maintenance machine in response to receiving the wireless output signal. The output signal portion may be configured to provide a wired output signal within the below-grade smart irrigation object. The below-grade smart irrigation object may be configured to actuate a physical visual indicator in response to receiving the wired output signal. The below-grade smart irrigation object may be configured to actuate a light-based visual indicator in response to receiving the wired output signal.

In another implementation, a below-grade smart irrigation object includes: an input signal portion configured to receive a wireless energizing signal for the below-grade smart irrigation object from a wirelessly-coupled turf maintenance machine; an output signal portion configured to provide a wireless output signal that indicates the location of the below-grade smart irrigation object to the wirelessly-coupled turf maintenance machine in response to receiving the energizing signal; and an irrigation portion configured to effectuate an irrigation operation.

One or more of the following features may be included. The wirelessly-coupled turf maintenance machine may include a turf aeration system. The wirelessly-coupled turf maintenance machine may be configured to raise at least a portion of the turf aeration system in response to receiving the wireless output signal. The wirelessly-coupled turf maintenance machine may be configured to disable at least a portion of the turf aeration system in response to receiving the wireless output signal. The wirelessly-coupled turf maintenance machine may be configured to provide a visual and/or audible notification in response to receiving the wireless output signal.

In another implementation, a below-grade smart irrigation object includes: an input signal portion configured to receive a wireless energizing signal for the below-grade smart irrigation object from a wirelessly-coupled turf maintenance machine; an output signal portion configured to provide a wired output signal within the below-grade smart irrigation object to indicate the location of the below-grade smart irrigation object in response to receiving the energizing signal; and an irrigation portion configured to effectuate an irrigation operation.

One or more of the following features may be included. The wirelessly-coupled turf maintenance machine may include a turf aeration system. The below-grade smart irrigation object may be configured to actuate a physical visual indicator in response to receiving the wired output signal. The below-grade smart irrigation object may be configured to actuate a light-based visual indicator in response to receiving the wired output signal.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Turf Maintenance Machine

Figure 1:
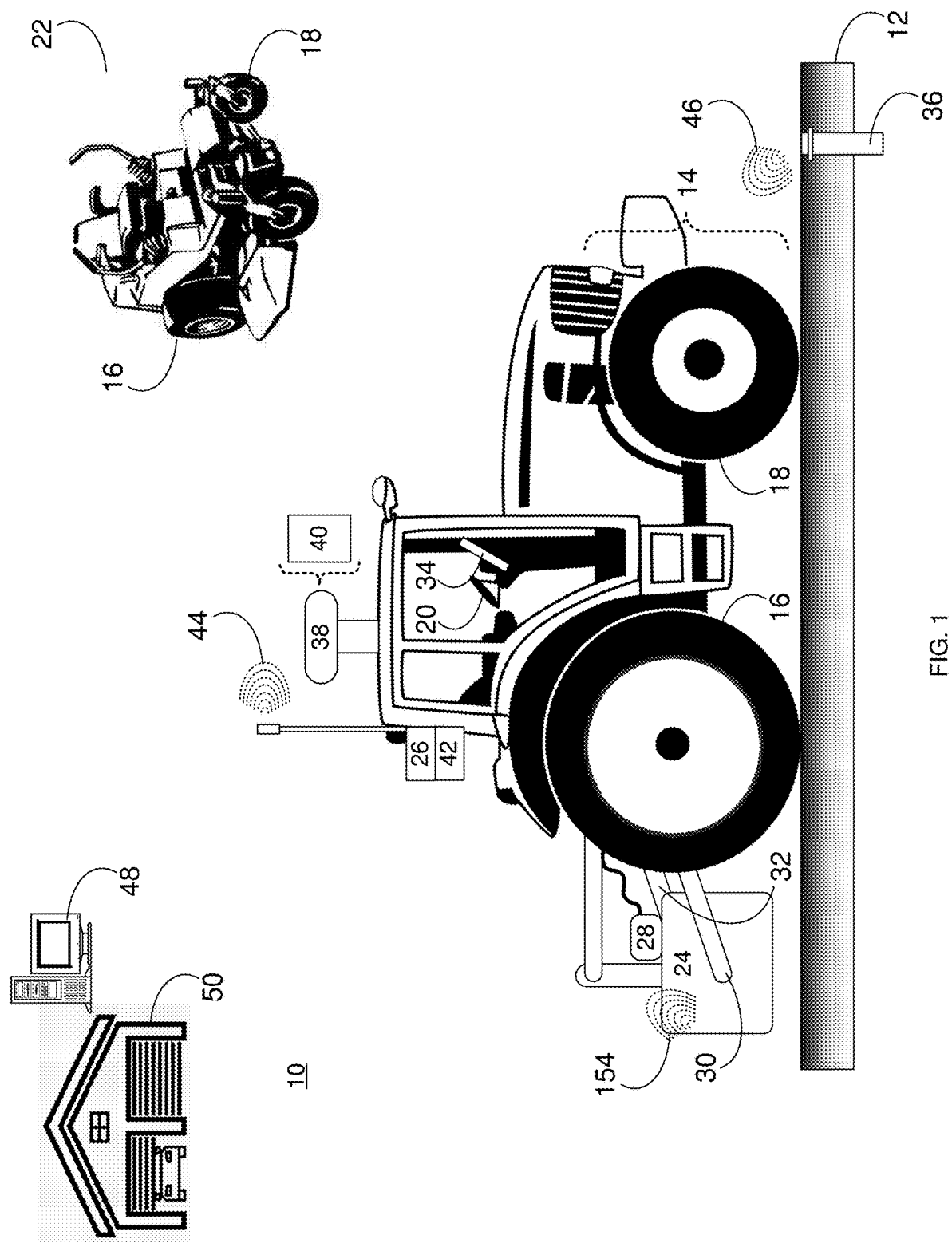
FIG. 1 is a diagrammatic view of a turf maintenance machine according to an embodiment of the present disclosure.

Referring to FIG. 1, there is shown turf maintenance machine 10 that may be used to maintain turf (e.g., turf 12) on a commercial/professional level. As is known in the art, examples of turf maintenance machine 10 may include but are not limited to products produced by companies such as Kubota™, John Deere™, Cub Cadet™, Husqvarna™, Exmark™ and Toro™.

Turf maintenance machine 10 may include moveable platform 14 configured to move turf maintenance machine 10 within an area to be maintained. Examples of such an area to be maintained may include but are not limited to any areas that include turf that must be maintained (e.g., golf courses, parks, baseball/football/soccer fields, and sport stadiums & arenas).

Moveable platform 14 may include any kind of propulsion/steering system that enables the movement of turf maintenance machine 10 within the area to be maintained. For example, moveable platform 14 may include one or more of a belt-actuated propulsion system, a chain-actuated propulsion system, a shaft-actuated propulsion system and/or a hydraulically-actuated propulsion system, wherein the rear wheels (e.g., rear wheels 16) or all wheels (e.g., rear wheels 16 and front wheels 18) of turf maintenance machine 10 may be driven by (i.e., powered by) this propulsion system. Depending upon the manner in which turf maintenance machine 10 is configured, some of the wheels on turf maintenance machine 10 may be steerable via e.g., steering wheel 20. Alternatively and when configured as a zero-turn-radius platform (e.g., ZTR platform 22), front wheels 18 of turf maintenance machine 10 may be configured to freely rotate, wherein the steering functionality of turf maintenance machine 10 may be effectuated by individually driving (e.g., either forward or backward) rear wheels 16 of turf maintenance machine 10.

As is known in the art, such turf maintenance machines (e.g., turf maintenance machine 10) may be configured to perform various tasks associated with maintaining turf, example of which may include but are not limited to: cutting the turf, fertilizing the turf, aerating the turf and dethatching the turf. While some of these turf maintenance operations tend to be non-invasive and do not actually penetrate the turf (e.g., cutting turf and fertilizing turf), other turf maintenance operations tend to be invasive and do actually penetrate the turf (e.g., aerating turf and dethatching turf).

In order to effectuate such an aeration operation, turf maintenance machine 10 may include turf aeration system 24 configured to aerate turf 12 within the area to be maintained. As is known in the art, aeration is the process of creating openings in the turf to help air, water and nutrients move into the soil to the turf roots, to alleviate soil compaction and to help reduce thatch. During the aeration process, aeration system 24 may aerate turf 12 by coring, spiking or slicing turf 12.

Core aeration is generally considered the most effective method, as it may use spoon-shaped (or hollow) tines to remove columns of turf, which are deposited onto the surface of the lawn. Spiking aeration may use solid tines to punch holes into turf 12, wherein slicing aeration may use rotating blades to cut narrow slits in turf 12. Spiking aeration and slicing aeration may move soil rather than removing it. Although spiking aeration and slicing aeration make less visual impact on the surface of turf 12, they may not be as effective in providing pockets for water, air and nutrients to enter the soil.

Figure 2:
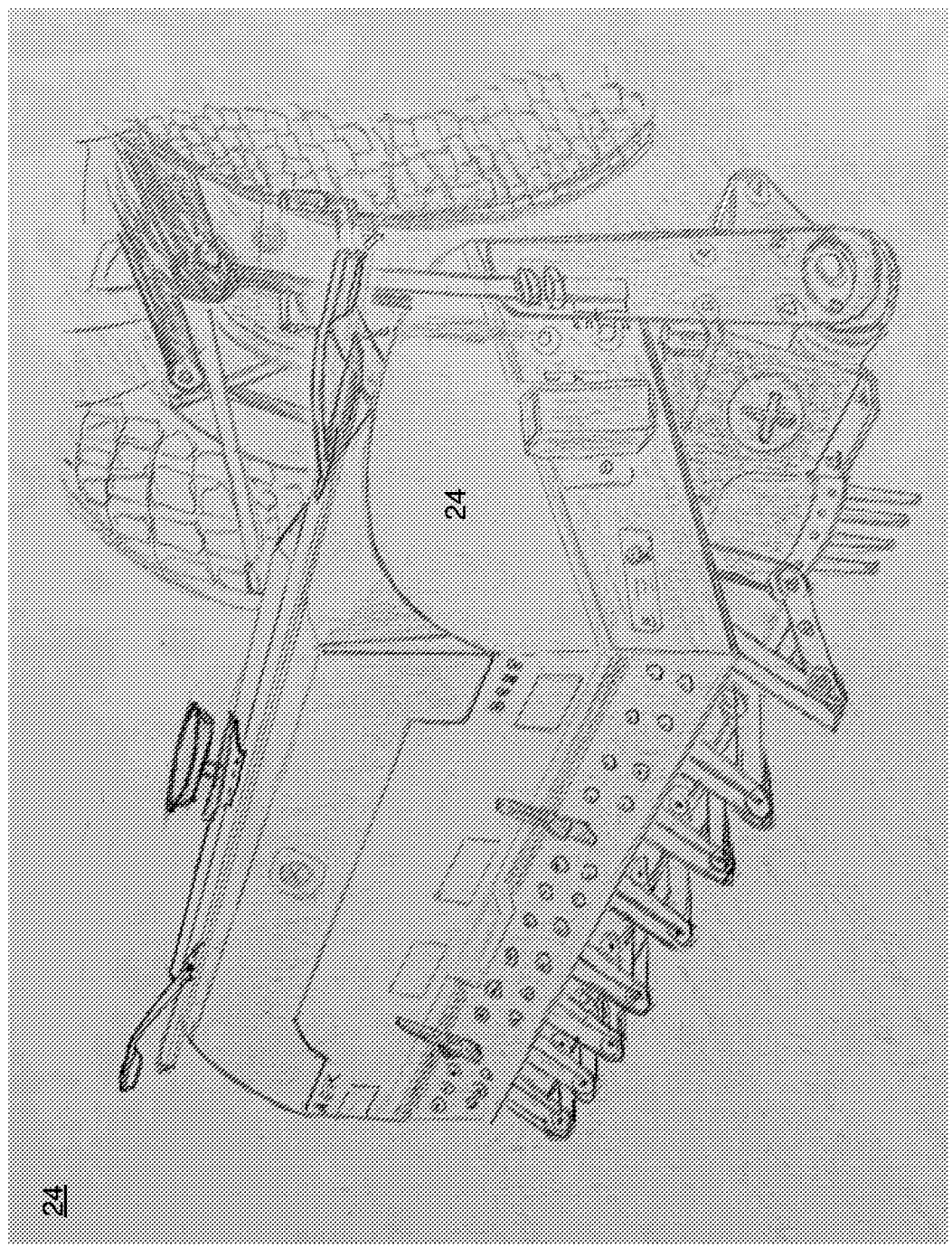
FIG. 2 is a diagrammatic view of one embodiment of a turf aeration system of the turf maintenance machine of FIG. 1 according to an embodiment of the present disclosure.
Figure 3:
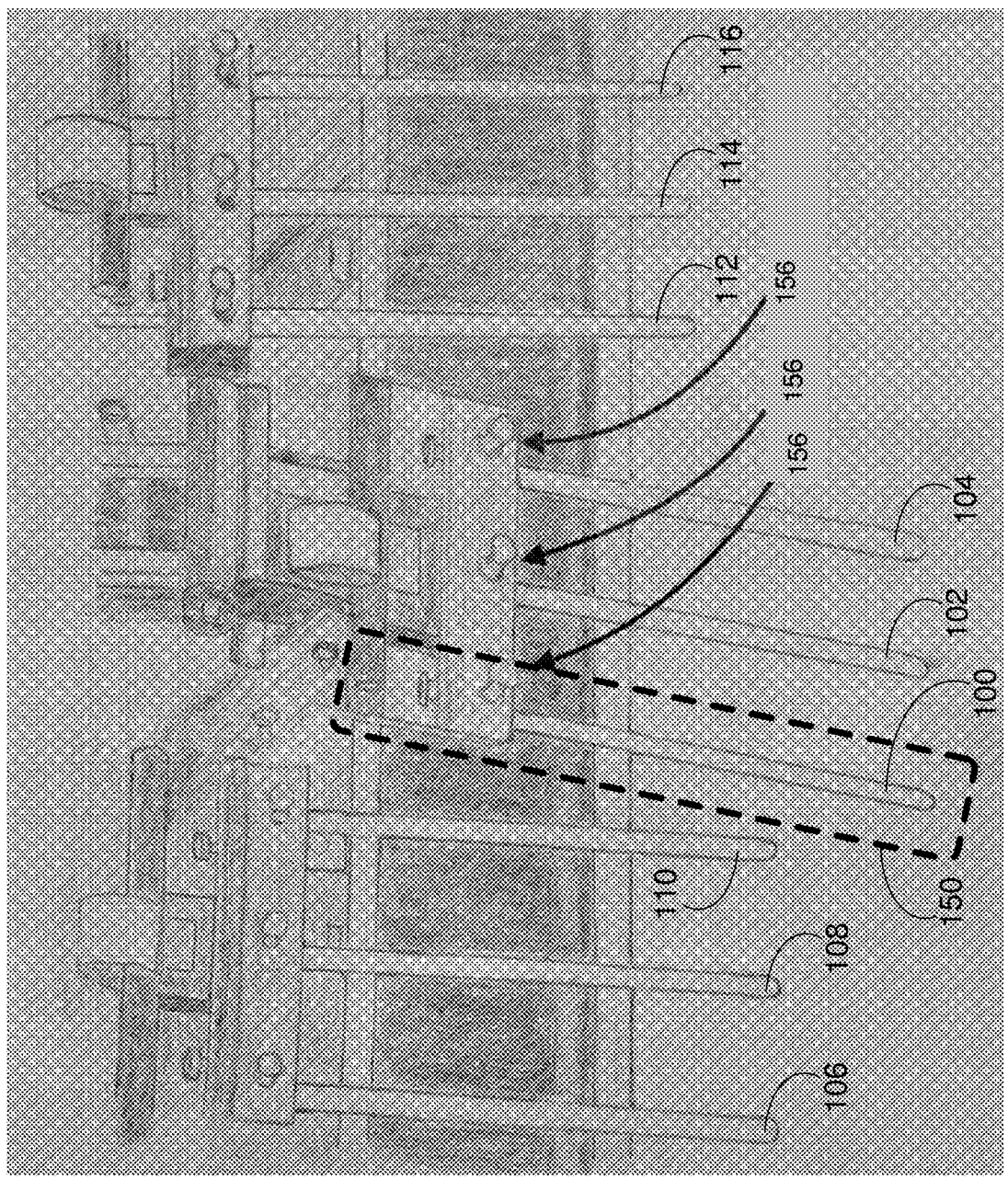
FIG. 3 is a diagrammatic view of one embodiment of a smart tine assembly of the turf aeration system of FIG. 2 according to an embodiment of the present disclosure.
Figure 4:
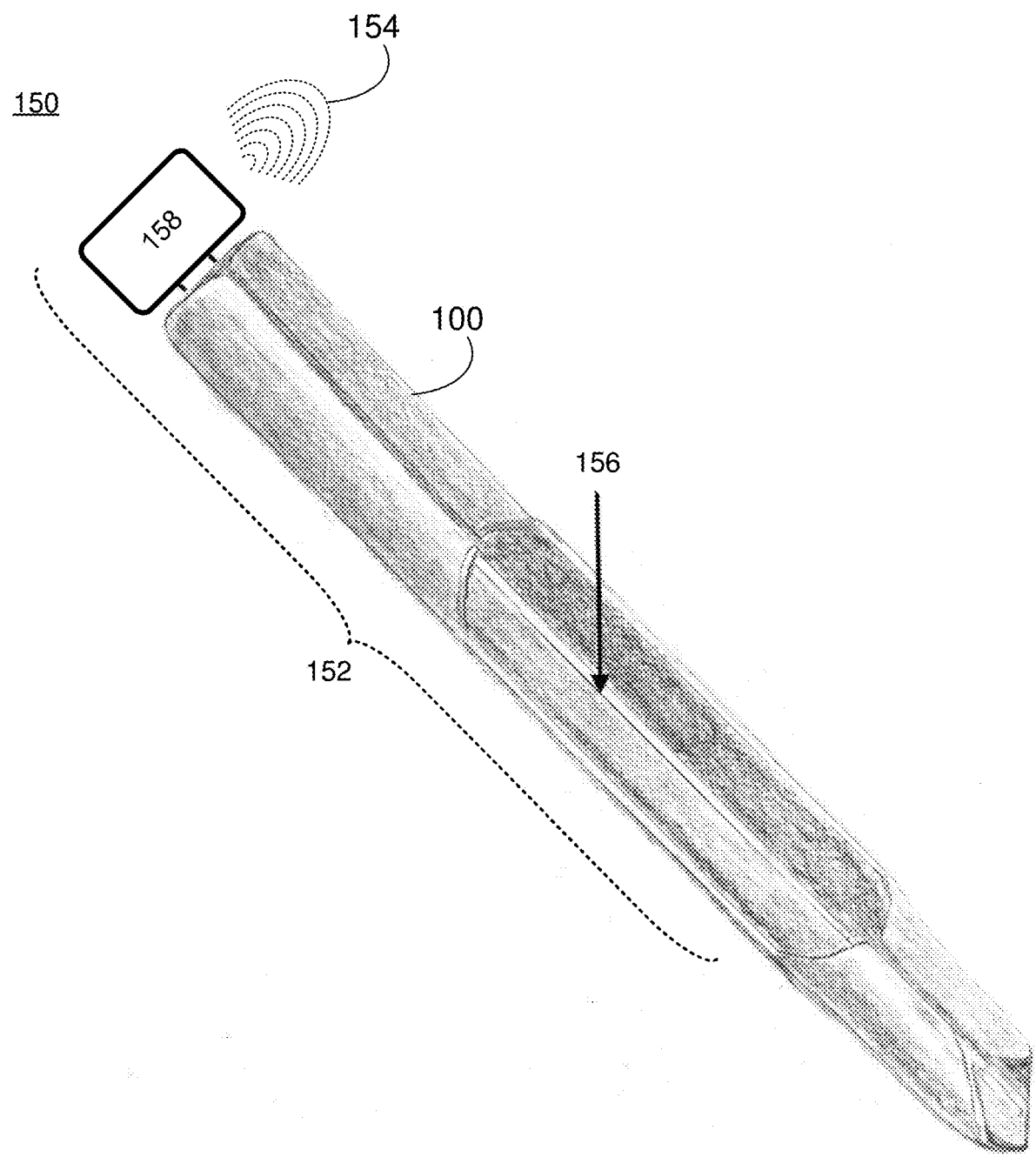
FIG. 4 is diagrammatic view of one embodiment of a smart tine assembly of the turf aeration system of FIG. 2 according to an embodiment of the present disclosure.

Referring also to FIGS. 2-4, there is shown a detail view of one implementation of turf aeration system 24, and the tines included therein. Turf aeration system 24 may include a plurality of tines (e.g., tines 100, 102, 104, 106, 108, 110, 112, 114, 116) configured to aerate turf 12 in one of the manners describe above (e.g., core aeration, spike aeration, slice aeration). For example, tines (e.g., tines 100, 102, 104, 106, 108, 110, 112, 114, 116) may reciprocate in an upward-downward motion (similar to a sewing needle) to core/spike/slice turf 12 to perform the aeration operation.

Unfortunately and during use of turf aeration system 24, one or more of these tines (e.g., tines 100, 102, 104, 106, 108, 110, 112, 114, 116) may be damaged (e.g., bent or broken) when e.g., a tine strikes a hard object (such as a rock) within turf 12. As could be imagined, in the event that one or more of these tines (e.g., tines 100, 102, 104, 106, 108, 110, 112, 114, 116) is damaged, the damaged tine may do considerable damage to turf 12. For example and if a tine is bent, the damaged tine may repeatedly tear into turf 12 when it strikes turf 12 at an angle.

Smart Tines (Concept 1)

Accordingly, turf aeration system 24 may include one or more smart tine assemblies (e.g., smart tine assembly 150). Smart tine assembly 150 may be configured to monitor the condition of a tine and detect if/when the tine is damaged (e.g., bent or broken). Smart tine assembly 150 may include a tine (e.g., tine 100) configured to aerate turf 12. Smart tine assembly 150 may also include damage sensing system 152 configured to sense when the tine (e.g., tine 100) is damaged (e.g., bent or broken) and generate a damaged tine signal (e.g., damaged tine signal 154).

In order for smart tine assembly 150 to sense that a tine (e.g., tine 100) is damaged (e.g., bent or broken), damage sensing system 152 may include one or more discrete sensors (e.g., sensor 156) included/embedded within (or affixed to) the tine (e.g., tine 100) being monitored by damage sensing system 152.

One example of sensor 156 included within damage sensing system 152 and included/embedded within (or affixed to) tine 100 may include a strain gauge configured to sense when the tine (e.g., tine 100) is damaged (e.g., bent or broken). As is known in the art, a strain gauge is a device used to measure the strain on an object (e.g., tine 100). A strain gauge typically includes an insulating flexible backing that supports a metallic foil pattern. If the object (e.g., tine 100) is damaged (e.g., bent or broken), the foil is deformed, resulting in the electrical resistance of the foil changing. Accordingly and by monitoring the electrical resistance of this foil, the condition of the object (e.g., tine 100) being monitored may be determined.

Another example of sensor 156 included within damage sensing system 152 and included/embedded within (or affixed to) tine 100 may include a flex sensor configured to sense when the tine (e.g., tine 100) is damaged (e.g., bent or broken). As is known in the art, a flex sensor is a sensor that measures the amount of deflection or bending of an object (e.g., tine 100). Typically, the flex sensor is adhered to the object (e.g., tine 100), wherein the resistance of the flex sensor is varied if the object (e.g., tine 100) is damaged (e.g., bent or broken). Accordingly and by monitoring the electrical resistance of the flex sensor, the condition of the object (e.g., tine 100) being monitored may be determined.

Another example of sensor 156 included within damage sensing system 152 and included/embedded within (or affixed to) tine 100 may include a fiberoptic sensor configured to sense when the tine (e.g., tine 100) is damaged (e.g., bent or broken). As is known in the art, a fiberoptic sensor may be adhered to an object (e.g., tine 100), wherein any bending/distortion of the object (e.g., tine 100) may be detected by a variation in the ability of the fiberoptic sensor to transmit light.

Another example of sensor 156 included within damage sensing system 152 and included/embedded within (or affixed to) tine 100 may include a conductive sensor configured to sense when the tine (e.g., tine 100) is damaged (e.g., bent or broken). As is known in the art, a conductive sensor is a sensor that measures the amount of deflection or bending of an object (e.g., tine 100). Typically, the conductive sensor is adhered to the object (e.g., tine 100), wherein the conductivity of the conductive sensor is varied if the object (e.g., tine 100) is damaged (e.g., bent or broken). Accordingly and by monitoring the conductivity of the conductive sensor, the condition of the object (e.g., tine 100) being monitored may be determined.

Smart tine assembly 150 may include wireless transmitter system 158 configured to wirelessly transmit damaged tine signal 154 to a remote location. One example of this remote location may include but is not limited to turf maintenance machine 10. Accordingly, turf maintenance machine 10 may include wireless receiver system 26 configured to receive damaged tine signal 154 from smart tine assembly 150. Alternatively, turf aeration system 24 may include a local wireless receiver (e.g., wireless receiver system 28) configured to receive damaged tine signal 154 from smart tine assembly 150, wherein wireless receiver system 28 may be electrically coupled (e.g., hardwired) to turf maintenance machine 10 so that damaged tine signal 154 may be provided to turf maintenance machine 10.

Damage sensing system 152 may be configured to be self-powered, wherein damage sensing system 152 may include the appropriate internal components (e.g., moveable magnets configured to slide proximate a coil; not shown) that convert the mechanical/reciprocal motion of (in this example) smart tine assembly 150 into electrical energy that may be used to power damage sensing system 152.

Once damaged tine signal 154 is received by turf maintenance machine 10, turf maintenance machine 10 may respond in various ways. For example and if turf maintenance machine 10 is configured to automatically suspend turf aeration in response to receiving damaged tine signal 154, turf maintenance machine 10 may be configured to:
- automatically raise at least a portion of turf aeration system 24 in response to receiving damaged tine signal 154;
- automatically disable at least a portion of turf aeration system 24 in response to receiving damaged tine signal 154; and
- provide a visual and/or audible notification to an operator of turf maintenance machine 10 in response to receiving damaged tine signal 154.

For example and if turf maintenance machine 10 is configured to automatically raise at least a portion of turf aeration system 24 in response to receiving damaged tine signal 154, turf maintenance machine 10 may include lift mechanism 30 (e.g., a hydraulic 3-point hitch lift mechanism) configured to raise turf aeration system 24 so that all of the tines (e.g., tines 100, 102, 104, 106, 108, 110, 112, 114, 116) included within turf aeration system 24 may no longer make contact with turf 12 in response to receiving damaged tine signal 154.

Further and if turf maintenance machine 10 is configured to automatically disable at least a portion of turf aeration system 24 in response to receiving damaged tine signal 154, turf maintenance machine 10 may include a system configured to stop some or all of the tines (e.g., tines 100, 102, 104, 106, 108, 110, 112, 114, 116) included within turf aeration system 24 from being actuated. For example, various internal clutch packs (not shown) and Power Take Offs (e.g., rear PTO 32) included within turf maintenance machine 10 that are driving/powering turf aeration system 24 may be depowered, thus disabling some or all of the tines (e.g., tines 100, 102, 104, 106, 108, 110, 112, 114, 116) included within turf aeration system 24. In order to avoid any (or additional) damage to turf 12, turf aeration system 24 may be configured so that when some or all of the tines (e.g., tines 100, 102, 104, 106, 108, 110, 112, 114, 116) included within turf aeration system 24 are disabled, such tines (e.g., tines 100, 102, 104, 106, 108, 110, 112, 114, 116) may retract into an upward position so that these tines (e.g., tines 100, 102, 104, 106, 108, 110, 112, 114, 116) included within turf aeration system 24 may no longer make contact with turf 12 in response to receiving damaged tine signal 154.

Additionally and if turf maintenance machine 10 is configured to provide a visual and/or audible notification to an operator of turf maintenance machine 10 in response to receiving damaged tine signal 154, turf maintenance machine 10 may be configured to:
- render a visual notification (e.g., "Tine Damaged . . . Stop Immediately" or "Tine Damaged . . . Lift Aerator Immediately") on an operator panel (e.g., operator panel 34) included within (or affixed to) turf maintenance machine 10 for visual notification of an operator of turf maintenance machine 10 in response to receiving damaged tine signal 154; and/or
- render an audible notification (e.g., a siren . . . a bell . . . a horn) via a device included within (or affixed to) turf maintenance machine 10 for audible notification of an operator of turf maintenance machine 10 in response to receiving damaged tine signal 154.

Upon the operator of turf maintenance machine 10 seeing (and/or hearing) the visual (and/or audible) notification, turf maintenance machine 10 may be configured to
- allow the operator of turf maintenance machine 10 to manually raise at least a portion of turf aeration system 24 in response to such visual and/or audible notifications, and/or
- allow the operator of turf maintenance machine 10 to manually disable at least a portion of turf aeration system 24 in response to the visual and/or audible notification.

As discussed above, smart tine assembly 150 may include wireless transmitter system 158 configured to wirelessly transmit damaged tine signal 154 to a remote location. Further and as discussed above, example of this remote location may include turf maintenance machine 10 and/or operator panel 34. However, it is understood that these examples of this remote location are meant to be illustrative and not all inclusive. Accordingly, other examples of this remote location may include but are not limited to: remote computer 48 and/or remote maintenance facility 50. For example, remote computer 48 may be a computing device within remote maintenance facility 50 that is configured to maintain turf maintenance equipment (e.g., turf maintenance machine 10). And if damaged tine signal 154 is wirelessly transmitted to remote computer 48 and/or remote maintenance facility 50, the fact that tine 100 within smart tine assembly 150 has been damaged will be known by remote computer 48 and/or remote maintenance facility 50, thus enabling e.g., the ordering of a replacement tine, the ordering of a replacement smart tine assembly, the scheduling of turf maintenance machine 10 for tine repair, etc.

Smart Turf Maintenance Machine w/GPS (Concept 3)

As discussed above, turf maintenance machine 10 may include moveable platform 14 configured to move turf maintenance machine 10 within an area to be maintained (e.g., golf courses, parks, baseball/football/soccer fields, and sport stadiums & arenas). This area to be maintained (e.g., golf courses, parks, baseball/football/soccer fields, and sport stadiums & arenas) may include a plurality of below-grade smart irrigation objects (e.g., below-grade smart irrigation object 36). Examples of below-grade smart irrigation object 36 may include various irrigation objects that are positioned partially (or fully) below the grade of turf 12, such as irrigation sprinkler heads, irrigation electrical junction boxes, and irrigation water junction boxes.

Turf maintenance machine 10 may include locating system 38 configured to determine if turf maintenance machine 10 is proximate one of the plurality of below-grade smart irrigation objects (e.g., below-grade smart irrigation object 36). Locating system 38 may include GPS technology configured to locate turf maintenance machine 10 via GPS coordinates within the area to be maintained. Locating system 38 may also be configured to define the location (e.g., via GPS coordinates) of each of the plurality of below-grade smart irrigation objects (e.g., below-grade smart irrigation object 36) within the area to be maintained. Accordingly, locating system 38 may include (or have access to) a map (e.g., location map 40) that defines the location of each of the plurality of below-grade smart irrigation objects (e.g., below-grade smart irrigation object 36) within the area to be maintained via e.g., GPS coordinates included within location map 40.

While locating system 38 is shown to be positioned upon the cab of turf maintenance machine 10, this is for illustrative purposes only and is not intended to be a limitation of this disclosure, as other configurations are possible and are considered to be within the scope of this disclosure. For example, locating system 38 may be positioned upon turf aeration system 24.

As discussed above, an example of locating system 38 may include GPS technology configured to locate turf maintenance machine 10 via GPS coordinates within the area to be maintained. Accordingly and in one implementation, locating system 38 may compare the GPS-based location of turf maintenance machine 10 to the GPS-based location of each of the plurality of below-grade smart irrigation objects (e.g., below-grade smart irrigation object 36) as defined within location map 40.

Assume for illustrative purposes that an operator of turf maintenance machine 10 is using turf maintenance machine 10 to aerate an area to be maintained (e.g., golf courses, parks, baseball/football/soccer fields, and sport stadiums & arenas). As discussed above and when aerating turf 12, tines are driven into the turf in order to make passages through which nutrients and/or water may penetrate turf 12. Therefore and in the event that an aeration operation is used to aerate turf proximate a below-grade smart irrigation object (e.g., below-grade smart irrigation object 36), it is possible that the penetrating tines (e.g., tines 100, 102, 104, 106, 108, 110, 112, 114, 116) of turf aeration system 24 may strike the proximate below-grade smart irrigation object (e.g., below-grade smart irrigation object 36), resulting to damage to the below-grade smart irrigation object (e.g., below-grade smart irrigation object 24), the striking tine (e.g., tine 100, 102, 104, 106, 108, 110, 112, 114, 116), or both.

Accordingly and in the event that, during the course of this aeration operation, locating system 38 determines that turf maintenance machine 10 is proximate the location of any of the plurality of below-grade smart irrigation objects (e.g., below-grade smart irrigation object 36), turf maintenance machine 10 may respond in various ways. For example and if turf maintenance machine 10 is configured to automatically suspend turf aeration in response to being proximate the location of any of the plurality of below-grade smart irrigation objects (e.g., below-grade smart irrigation object 36), turf maintenance machine 10 may be configured to:

automatically raise at least a portion of turf aeration system 24 in response to being proximate the location of any of the plurality of below-grade smart irrigation objects (e.g., below-grade smart irrigation object 36);

automatically disable at least a portion of turf aeration system 24 in response to being proximate the location of any of the plurality of below-grade smart irrigation objects (e.g., below-grade smart irrigation object 36); and provide a visual and/or audible notification to an operator of turf maintenance machine 10 in response to being proximate the location of any of the plurality of below-grade smart irrigation objects (e.g., below-grade smart irrigation object 36).

For example and if turf maintenance machine 10 is configured to automatically raise at least a portion of turf aeration system 24 in response to being proximate the location of any of the plurality of below-grade smart irrigation objects (e.g., below-grade smart irrigation object 36), turf maintenance machine 10 may include lift mechanism 30 (e.g., a hydraulic 3-point hitch lift mechanism) configured to raise turf aeration system 24 so that all of the tines (e.g., tines 100, 102, 104, 106, 108, 110, 112, 114, 116) included within turf aeration system 24 may no longer make contact with turf 12 in response to being proximate the location of any of the plurality of below-grade smart irrigation objects (e.g., below-grade smart irrigation object 36).

Further and if turf maintenance machine 10 is configured to automatically disable at least a portion of turf aeration system 24 in response to being proximate the location of any of the plurality of below-grade smart irrigation objects (e.g., below-grade smart irrigation object 36), turf maintenance machine 10 may include a system configured to stop some or all of the tines (e.g., tines 100, 102, 104, 106, 108, 110, 112, 114, 116) included within turf aeration system 24 from being actuated. For example, various internal clutch packs (not shown) and Power Take Offs (e.g., rear PTO 32) included within turf maintenance machine 10 that are driving/powering turf aeration system 24 may be depowered, thus disabling some or all of the tines (e.g., tines 100, 102, 104, 106, 108, 110, 112, 114, 116) included within turf aeration system 24. In order to avoid damage to turf 12, turf aeration system 24 may be configured so that when some or all of the tines (e.g., tines 100, 102, 104, 106, 108, 110, 112, 114, 116) included within turf aeration system 24 are disabled, such tines (e.g., tines 100, 102, 104, 106, 108, 110, 112, 114, 116) may retract into an upward position so that these tines (e.g., tines 100, 102, 104, 106, 108, 110, 112, 114, 116) included within turf aeration system 24 may no longer make contact with turf 12 in response to being proximate the location of any of the plurality of below-grade smart irrigation objects (e.g., below-grade smart irrigation object 36).

Additionally and if turf maintenance machine 10 is configured to provide a visual and/or audible notification to an operator of turf maintenance machine 10 in response to being proximate the location of any of the plurality of below-grade smart irrigation objects (e.g., below-grade smart irrigation object 36), turf maintenance machine 10 may be configured to:
  render a visual notification (e.g., "Object Proximate . . . Stop Immediately" or "Object Proximate . . . Lift Aerator Immediately") on an operator panel (e.g., operator panel 34) included within (or affixed to) turf maintenance machine 10 for visual notification of an operator of turf maintenance machine 10 in response to being proximate the location of any of the plurality of below-grade smart irrigation objects (e.g., below-grade smart irrigation object 36); and/or
  render an audible notification (e.g., a siren . . . a bell . . . a horn) via a device included within (or affixed to) turf maintenance machine 10 for audible notification of an operator of turf maintenance machine 10 in response to being proximate the location of any of the plurality of below-grade smart irrigation objects (e.g., below-grade smart irrigation object 36).

Upon the operator of turf maintenance machine 10 seeing (and/or hearing) the visual (and/or audible) notification, turf maintenance machine 10 may be configured to
  allow the operator of turf maintenance machine 10 to manually raise at least a portion of turf aeration system 24 in response to such visual and/or audible notifications, and/or
  allow the operator of turf maintenance machine 10 to manually disable at least a portion of turf aeration system 24 in response to the visual and/or audible notification.

Additionally, locating system 38 may be configured to allow an operator of turf maintenance machine 10 to define the location of additional below-grade smart irrigation objects within the area to be maintained (e.g., golf courses, parks, baseball/football/soccer fields, and sport stadiums & arenas).

For example, assume that the operator of turf maintenance machine 10 locates a previously-installed below-grade smart irrigation object that was not defined within location map 40. Accordingly, locating system 38 may be configured to allow the operator of turf maintenance machine 12 to define the location of this newly-located, below-grade smart irrigation object within location map 40 using the GPS coordinates defined by locating system 38 of turf maintenance machine 10.

Further, assume that the operator of turf maintenance machine 10 is installing a new below-grade smart irrigation object that (obviously) is not defined within location map 40. Accordingly, locating system 38 may be configured to allow the operator of turf maintenance machine 10 to define the location of this newly-installed, below-grade smart irrigation object within location map 40 using the GPS coordinates defined by locating system 38 of turf maintenance machine 10.

Smart Turf Maintenance Machine w/Wireless (Concept 2)

Turf maintenance machine 10 may include wireless transmitter system 42 configured to provide a wireless energizing signal (e.g., wireless energizing signal 44) to below-grade smart irrigation objects (e.g., below-grade smart irrigation object 36). As will be explained below in greater detail, this wireless energizing signal (e.g., wireless energizing signal 44) may be a low-power signal (such as an RFID signal) that has a limited transmission range. As such, this wireless energizing signal (e.g., wireless energizing signal 44) may only be received by proximate (i.e., close) below-grade smart irrigation objects (e.g., below-grade smart irrigation object 36). In response to receiving this wireless energizing signal (e.g., wireless energizing signal 44), the proximate below-grade smart irrigation objects (e.g., below-grade smart irrigation object 36) may generate a wireless output signal (e.g., wireless output signal 46).

As discussed above, turf maintenance machine 10 may include wireless receiver system 26 configured to receive wireless signals. Accordingly, wireless receiver system 26 may be configured to receive the wireless output signal (e.g., wireless output signal 46) that was generated by the below-grade smart irrigation object (e.g., below-grade smart irrigation object 36) in response to receiving the wireless energizing signal (e.g., wireless energizing signal 44). Accordingly, if a wireless output signal (e.g., wireless output signal 46) is received by wireless receiver system 26 of turf maintenance machine 10, a below-grade smart irrigation object (e.g., below-grade smart irrigation object 36) is proximate.

Once wireless output signal 46 is received by turf maintenance machine 10, turf maintenance machine 10 may respond in various ways. For example and if turf maintenance machine 10 is configured to automatically suspend turf aeration in response to receiving wireless output signal 46, turf maintenance machine 10 may be configured to:
  automatically raise at least a portion of turf aeration system 24 in response to receiving wireless output signal 46;
  automatically disable at least a portion of turf aeration system 24 in response to receiving wireless output signal 46; and
  provide a visual and/or audible notification to an operator of turf maintenance machine 10 in response to receiving wireless output signal 46.

For example and if turf maintenance machine 10 is configured to automatically raise at least a portion of turf aeration system 24 in response to receiving wireless output signal 46, turf maintenance machine 10 may include lift mechanism 30 (e.g., a hydraulic 3-point hitch lift mechanism) configured to raise turf aeration system 24 so that all of the tines (e.g., tines 100, 102, 104, 106, 108, 110, 112, 114, 116) included within turf aeration system 24 may no longer make contact with turf 12 in response to receiving wireless output signal 46.

Further and if turf maintenance machine 10 is configured to automatically disable at least a portion of turf aeration system 24 in response to receiving wireless output signal 46, turf maintenance machine 10 may include a system configured to stop some or all of the tines (e.g., tines 100, 102, 104, 106, 108, 110, 112, 114, 116) included within turf aeration system 24 from being actuated. For example, various internal clutch packs (not shown) and Power Take Offs (e.g., rear PTO 32) included within turf maintenance machine 10 that are driving/powering turf aeration system 24 may be depowered, thus disabling some or all of the tines (e.g., tines 100, 102, 104, 106, 108, 110, 112, 114, 116) included within turf aeration system 24. In order to avoid damage to turf 12, turf aeration system 24 may be configured so that when some or all of the tines (e.g., tines 100, 102, 104, 106, 108, 110, 112, 114, 116) included within turf aeration system 24 are disabled, such tines (e.g., tines 100, 102, 104, 106, 108, 110, 112, 114, 116) may retract into an upward position so that these tines (e.g., tines 100, 102, 104, 106, 108, 110, 112, 114, 116) included within turf aeration system 24 may no longer make contact with turf 12 in response to receiving wireless output signal 46.

Additionally and if turf maintenance machine 10 is configured to provide a visual and/or audible notification to an operator of turf maintenance machine 10 in response to receiving wireless output signal 46, turf maintenance machine 10 may be configured to:

- render a visual notification (e.g., "Object Proximate . . . Stop Immediately" or "Object Proximate . . . Lift Aerator Immediately") on an operator panel (e.g., operator panel 34) included within (or affixed to) turf maintenance machine 10 for visual notification of an operator of turf maintenance machine 10 in response to receiving wireless output signal 46; and/or
- render an audible notification (e.g., a siren . . . a bell . . . a horn) via a device included within (or affixed to) turf maintenance machine 10 for audible notification of an operator of turf maintenance machine 10 in response to receiving wireless output signal 46.

Upon the operator of turf maintenance machine 10 seeing (and/or hearing) the visual (and/or audible) notification, turf maintenance machine 10 may be configured to

- allow the operator of turf maintenance machine 10 to manually raise at least a portion of turf aeration system 24 in response to such visual and/or audible notifications, and/or
- allow the operator of turf maintenance machine 10 to manually disable at least a portion of turf aeration system 24 in response to the visual and/or audible notification.

Below-Grade Smart Irrigation Objects (Concept 4/5)

Figure 5:
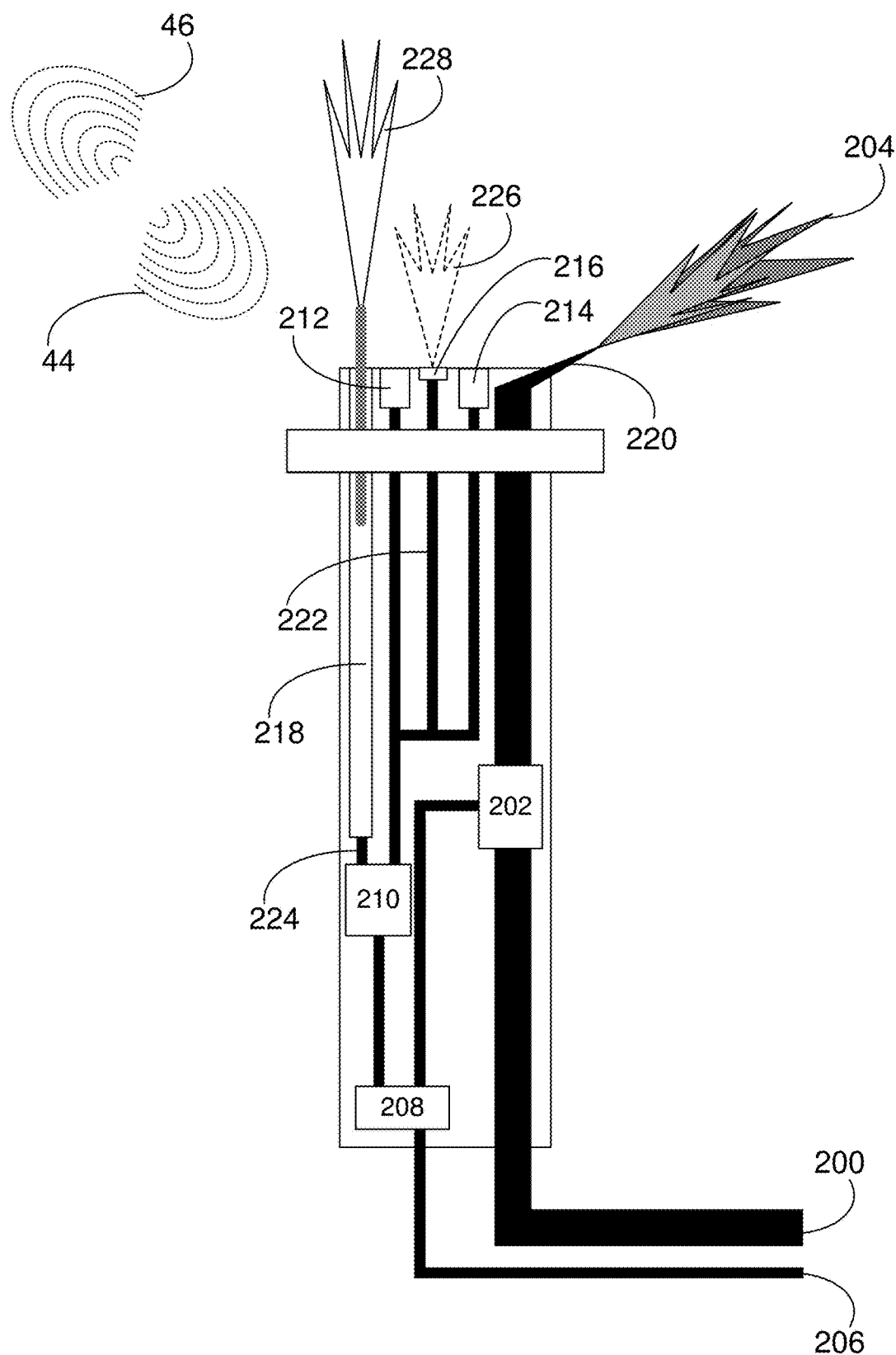
FIG. 5 is a diagrammatic view of smart irrigation object according to an embodiment of the present disclosure.

Referring also to FIG. 5, there is shown a detail view of one of the plurality of below-grade smart irrigation objects (e.g., below-grade smart irrigation object 36). Below-grade smart irrigation object 36 may be coupled to water supply 200, wherein a valve assembly (e.g., valve assembly 202) may be used to control the discharge of water (e.g., discharge 204) from below-grade smart irrigation object 36. Electrical supply line 206 may enable the coupling of below-grade smart irrigation object 36 to an electrical source e.g., a low voltage power supply).

Below-grade smart irrigation object 36 may include various electrical components, examples of which may include but are not limited to: power splitter 208, control circuitry 210, wireless receiver 212, wireless transmitter 214, light assembly 216, marker assembly 218 and nozzle assembly 220.

Below-grade smart irrigation object 36 may include an irrigation portion configured to effectuate an irrigation operation. For example, the irrigation portion of below-grade smart irrigation object 36 may include (in this example) valve assembly 202 and nozzle assembly 220.

During operation of below-grade smart irrigation object 36, water supply 200 may be a constant supply of water and valve assembly 202 may be normally closed, thus preventing this pressurized water source from accessing nozzle assembly 220. In the event that the area proximate below-grade smart irrigation object 36 need to be watered, electrical supply line 206 may provide an electrical signal to valve assembly 202, which may open valve assembly 202, allowing pressurized water to access nozzle assembly, thus resulting in the discharge of water (e.g., discharge 204) from below-grade smart irrigation object 36.

Below-grade smart irrigation object 36 may also include an input signal portion configured to receive an energizing signal (e.g., wireless energizing signal 44) for below-grade smart irrigation object 26. For example, the input signal portion of below-grade smart irrigation object 36 may include (in this example) control circuitry 210 and wireless receiver 212.

Below-grade smart irrigation object 36 may also include an output signal portion configured to indicate the location of below-grade smart irrigation object 26 in response to receiving the energizing signal (e.g., wireless energizing signal 44). For example, the output signal portion of below-grade smart irrigation object 36 may include (in this example) control circuitry 210 and wireless transmitter 214.

In order for control circuitry 210, wireless receiver 212 and wireless transmitter 214 to function properly, these devices may need a constant supply of electrical power. Accordingly, control circuitry 210, wireless receiver 212 and wireless transmitter 214 may not function properly if electrical supply line 206 is only energized when providing an "open" signal to valve assembly 202 (i.e., when irrigating the area proximate below-grade smart irrigation object 36).

Accordingly, electrical supply line 206 may be configured so that it provides a constant source of electrical energy to control circuitry 210, wireless receiver 212 and wireless transmitter 214; while providing a switched source of electrical energy to valve assembly 202 only during times when irrigation of the area proximate below-grade smart irrigation object 36 is needed.

If providing two separate electrical sources (e.g., one constant source and one switched source) is impractical, power splitter 208 may be utilized. For example, a constant source of AC power (e.g., 12 VAC) may be provided to below-grade smart irrigation object 36, wherein this AC signal may be exclusively provided to control circuitry 210 and blocked from valve assembly 202 (which may be accomplished via a filter that blocks AC signals from reaching valve assembly 202). Additionally, the control signal for valve assembly 202 may be a 12 VDC signal that rides on top of the constant 12 VAC signal whenever valve assembly 202 needs to be energized. This DC signal may be exclusively provided to valve assembly 202 and blocked from control circuitry 210 (which may be accomplished via a filter that blocks DC signals from reaching control circuitry 210).

Accordingly and when valve assembly 202 does not need to be energized, electrical supply line 206 may supply an electrical signal that oscillates between −6 volts and +6 volts (for a total of 12 VAC). However and when valve assembly 202 needs to be energized, electrical supply line 206 may supply an electrical signal that oscillates between +6 volts and +18 volts (i.e., a signal that is a combination of a 12 VAC signal with a 12 VDC offset).

Alternatively, control circuitry 210, wireless receiver 212 and wireless transmitter 214 may be configured as passive RFID devices that are momentarily energized by the energy of wireless energizing signal 44 and depowered when wireless energizing signal 44 is no longer received.

Alternatively still, control circuitry 210, wireless receiver 212 and wireless transmitter 214 may be configured to be powered by a solar cell (not shown) positioned on the top of below-grade smart irrigation object 36.

The above-described input signal portion (e.g., control circuitry 210 and wireless receiver 212) may be configured to receive a wireless energizing signal (e.g., wireless energizing signal 44) from a wirelessly-coupled turf maintenance machine (e.g., turf maintenance machine 10).

Additionally/alternatively, the above-described input signal portion (e.g., control circuitry 210 and wireless receiver 212) may be configured to receive a wireless energizing signal (e.g., wireless energizing signal 44) from a remote electronic device, examples of which may include but are not limited to one or more of: a personal computer; a wireless electronic device; a control panel; and a master control system.

In response to receiving the wireless energizing signal (e.g., wireless energizing signal 44), the above-described output signal portion (e.g., control circuitry 210 and wireless transmitter 214) may be configured to provide a wireless output signal (e.g., wireless output signal 46) that indicates the location of below-grade smart irrigation object 36 to the wirelessly-coupled turf maintenance machine (e.g., turf maintenance machine 10).

Additionally, the above-described output signal portion may be configured to provide a wired output signal within below-grade smart irrigation object 36 in response to receiving the wireless energizing signal (e.g., wireless energizing signal 44). For example, wired output signal 222 may be provided to light assembly 216 in response to receiving the wireless energizing signal (e.g., wireless energizing signal 44); and wired output signal 224 may be provided to marker assembly 218 in response to receiving the wireless energizing signal (e.g., wireless energizing signal 44).

Below-grade smart irrigation object 28 may be configured to actuate a light-based visual indicator in response to receiving wired output signal 222. For example and upon receiving wired output signal 222, light assembly 216 may illuminate light assembly 216 in a continuous or strobed fashion.

Below-grade smart irrigation object 28 may be configured to actuate a physical visual indicator in response to receiving wired output signal 224. For example and upon receiving wired output signal 224, marker assembly 218 may actuate a visible flag (e.g., visible flag 228) that is temporarily deployed from marker assembly 218.

Accordingly, wireless energizing signal 44 may result in below-grade smart irrigation object 36 producing a local visual response (e.g., actuating a physical visual indicator such as a flag, or actuating a light-based visual indicator such as a light assembly), wherein turf maintenance machine 10 may be configured to allow the operator to manually raise at least a portion of turf aeration system 24 in response to the local visual response and/or manually disable at least a portion of turf aeration system 24 in response to the local visual response.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A below-grade smart irrigation object comprising:
   an input signal portion configured to receive an energizing signal for the below-grade smart irrigation object;
   an output signal portion configured to indicate the location of the below-grade smart irrigation object in response to receiving the energizing signal, and wherein the output portion is configured to provide a wireless output signal that indicates the location of the below grade smart irrigation object to a wirelessly coupled turf maintenance machine including a turf aeration system, and the wirelessly coupled turf maintenance machine is configured to one or more of:
      raise at least a portion of the turf aeration system in response to receiving the wireless output signal;
      disable at least a portion of the turf aeration system in response to receiving the wireless output signal; and
      provide a visual and/or audible notification to an operator of the turf maintenance machine in response to receiving the wireless output signal; and
   an irrigation portion configured to effectuate an irrigation operation.

2. The below-grade smart irrigation object of claim 1 wherein the input signal portion is configured to receive a wireless energizing signal from a wirelessly-coupled turf maintenance machine.

3. The below-grade smart irrigation object of claim 2 wherein the wirelessly-coupled turf maintenance machine includes a turf aeration system.

4. The below-grade smart irrigation object of claim 1 wherein the input signal portion is configured to receive a wired energizing signal from a remote electronic device.

5. The below-grade smart irrigation object of claim 4 wherein the remote electronic device includes one or more of:
   a personal computer;
   a wireless electronic device;
   a control panel; and
   a master control system.

6. The below-grade smart irrigation object of claim 1 wherein the output signal portion is configured to provide a wired output signal within the below-grade smart irrigation object.

7. The below-grade smart irrigation object of claim 6 wherein the below-grade smart irrigation object is configured to actuate a physical visual indicator in response to receiving the wired output signal.

8. The below-grade smart irrigation object of claim 6 wherein the below-grade smart irrigation object is configured to actuate a light-based visual indicator in response to receiving the wired output signal.

9. A below-grade smart irrigation object comprising:
   an input signal portion configured to receive a wireless energizing signal for the below-grade smart irrigation object from a wirelessly-coupled turf maintenance machine;
   an output signal portion configured to provide a wireless output signal that indicates the location of the below-grade smart irrigation object to the wirelessly-coupled turf maintenance machine in response to receiving the energizing signal, wherein the turf maintenance machine includes a turf aeration system, and the wirelessly coupled turf maintenance machine is configured to one or more of:
      raise at least a portion of the turf aeration system in response to receiving the wireless output signal;
      disable at least a portion of the turf aeration system in response to receiving the wireless output signal; and
      provide a visual and/or audible notification to an operator of the turf maintenance machine in response to receiving the wireless output signal; and
   an irrigation portion configured to effectuate an irrigation operation.

10. A below-grade smart irrigation object comprising:
    an input signal portion configured to receive a wireless energizing signal for the below-grade smart irrigation object from a wirelessly-coupled turf maintenance machine;
    an output signal portion configured to provide a wired output signal within the below-grade smart irrigation object to indicate the location of the below-grade smart irrigation object in response to receiving the energizing signal, and wherein the output signal portion is further configured to provide a wireless output signal that indicates the location of the below-grade smart irrigation object to the wirelessly-coupled turf maintenance machine in response to receiving the energizing signal, wherein the turf maintenance machine includes a turf aeration system, and the wirelessly coupled turf maintenance machine is configured to one or more of:
       raise at least a portion of the turf aeration system in response to receiving the wireless output signal;
       disable at least a portion of the turf aeration system in response to receiving the wireless output signal; and
       provide a visual and/or audible notification to an operator of the turf maintenance machine in response to receiving the wireless output signal; and
    an irrigation portion configured to effectuate an irrigation operation.

11. The below-grade smart irrigation object of claim 10 wherein the below-grade smart irrigation object is configured to actuate a physical visual indicator in response to receiving the wired output signal.

12. The below-grade smart irrigation object of claim 10 wherein the below-grade smart irrigation object is configured to actuate a light-based visual indicator in response to receiving the wired output signal.

* * * * *